(12) United States Patent
Pedersen

(10) Patent No.: US 9,422,984 B2
(45) Date of Patent: Aug. 23, 2016

(54) BEARING HAVING A RACEWAY WITH HIGH CHROMIUM CONTENT

(71) Applicant: Siemens Aktiengesellschaft, Munich (DE)

(72) Inventor: Karl Martin Pedersen, Loesning (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 69 days.

(21) Appl. No.: 14/561,292

(22) Filed: Dec. 5, 2014

(65) Prior Publication Data

US 2015/0219159 A1  Aug. 6, 2015

(30) Foreign Application Priority Data

Feb. 3, 2014  (EP) .................................. 14153691

(51) Int. Cl.
| | | |
|---|---|---|
| *F16C 33/62* | (2006.01) | |
| *C21D 1/18* | (2006.01) | |
| *C23C 8/04* | (2006.01) | |
| *F16C 43/04* | (2006.01) | |

(52) U.S. Cl.
CPC . *F16C 33/62* (2013.01); *C21D 1/18* (2013.01); *C23C 8/04* (2013.01); *F03D 80/70* (2016.05); *F16C 43/04* (2013.01); *F16C 2204/44* (2013.01); *F16C 2204/70* (2013.01); *F16C 2360/31* (2013.01); *Y02E 10/722* (2013.01); *Y02P 70/523* (2015.11); *Y10T 29/4968* (2015.01)

(58) Field of Classification Search
CPC ....... F16C 2204/70; F16C 33/58; F16C 33/62
See application file for complete search history.

(56) References Cited

U.S. PATENT DOCUMENTS

| | | | | |
|---|---|---|---|---|
| 2,845,311 A | * | 7/1958 | Cobb ...................... | F16C 33/60 384/569 |
| 2013/0016938 A1 | * | 1/2013 | Okada ..................... | F16C 33/32 384/492 |

FOREIGN PATENT DOCUMENTS

| | | |
|---|---|---|
| DE | 102011113122 A | 12/2012 |
| JP | 2005023964 A | 1/2005 |
| JP | 2007120632 A | 5/2007 |
| JP | 2013096448 A | 5/2013 |

OTHER PUBLICATIONS

Hiromichi Takemura et al.: "Development of Long Life Pulley-Supporting bearing for Belt-CVT" SAE Technical Paper 2005-01-0873; 2005.

* cited by examiner

*Primary Examiner* — Thomas R. Hannon
(74) *Attorney, Agent, or Firm* — Beusse Wolter Sanks & Maire

(57) ABSTRACT

A bearing for a wind turbine is provided. The bearing includes an inner ring and an outer ring concentrically arranged about an axis of rotation. Furthermore, the bearing includes rollers interposed between the inner ring and the outer ring. At least one of the inner ring and the outer ring has a layer that functions as a raceway for the rollers. A main body of a corresponding one of the inner ring or the outer ring has a first metal composition having a first chromium content. The layer includes a second metal composition having a second chromium content higher than the first chromium content. A method of manufacturing such a bearing is also provided.

10 Claims, 2 Drawing Sheets

BEARING HAVING A RACEWAY WITH HIGH CHROMIUM CONTENT

CROSS REFERENCE TO RELATED APPLICATIONS

This application claims the benefit of European Application No. EP14153691 filed Feb. 3, 2014, incorporated by reference herein in its entirety.

FIELD OF INVENTION

The invention relates to a bearing for a wind turbine and a method of manufacturing such a bearing.

BACKGROUND OF INVENTION

As the nominal output power of wind turbines increases, so do the size and weight of the individual components of the wind turbines. For example, rotor diameters of current large wind turbines exceed a hundred meters. Accordingly the weight born by bearings of the wind turbines has increased dramatically over the years. During operation changes of wind direction and speed occur frequently which adds to the loads put on the bearings. Hence, there is a need for bearings that can bear very high loads without experiencing problems due to fatigue such as crack generation and the like.

Accordingly it is an object of the invention to provide a bearing that can withstand very high loads. It is another object of the invention to provide a method of manufacturing such a bearing.

SUMMARY OF THE INVENTION

For these reasons the invention provides a bearing for a wind turbine. The bearing includes an inner ring and an outer ring concentrically arranged about an axis of rotation. The outer ring has an outer raceway at an inner side of the outer ring and the inner ring has an inner raceway at an outer side of the inner ring. The outer raceway and the inner raceway are adapted to bear a plurality of rollers rotatably arranged on the outer raceway and the inner raceway and between the inner ring and the outer ring. According to aspects of the invention the bearing further comprises at least one layer arranged on one of the outer raceway and the inner raceway. Furthermore, a main body of a corresponding one of the inner ring or the outer ring comprises a first metal composition having a first chromium content. The layer comprises a second metal composition having a second chromium content higher than the first chromium content. In particular the bearing of the invention may include one layer arranged on either the inner raceway or on the outer raceway or it may comprise two layers, wherein one of the layers is arranged on the inner raceway and the other on the outer raceway. In such a case each of the layers has a higher chromium content than the ring of the bearing whereon it is arranged.

The raceways are the parts of the bearing that experiences the highest loads during operation of the wind turbine. The higher chromium content makes it more resistive against stress caused by the high loads and is especially effective against white etching cracks which is characterised by formation of subsurface cracks with transformed material around the cracks. The material around the cracks will appear white in light optical microscopes when etched using Nital.

The higher chromium content of the layer entails higher material costs. Thus, using different metal compositions for the main body of the bearing rings and the layer to be placed on the raceway(s) provides a bearing that is both robust against high loads and low-priced. The invention is especially suitable for bearings having an inner and/or outer ring primarily made of an iron-based alloy because other alloys such as Ni-based superalloys are less susceptible to white etching cracks but are also far more expensive.

The precise depth in which the cracks are most likely to occur depends on the geometry of the bearing. Thus, the thickness of the layer(s) should be chosen in accordance with the geometry of the bearing. Preferably the layer has a thickness of at least 1 millimeter. The white etching cracks usually appear just below the surface of the raceway where the highest Hertzian pressure occurs. Accordingly a thickness of at least 1 millimeter is advantageous in order to effectively reduce the susceptibility of the bearing to white etching cracks.

Furthermore, the layer preferably has a thickness of 4 millimeters at most. White etching cracks rarely appear more than 4 millimeters below the surface that bears the load such that a thicker raceway would increase the total cost of the bearing without causing an improvement that would justify this increase.

The second chromium content may be at least 5 percent by weight. A chromium content of at least 15 percent by weight appears to make the material mostly immune to the formation of white etching cracks and thus is a preferred embodiment of the invention. However, a substantial improvement in robustness may already be achieved with chromium contents as low as 5 or 10 percent by weight. Other alloying elements may also be present, e.g. C, Mo, Ni, Mn, Si and/or N.

The layer is arranged on a contact region of the main body. The corresponding one of the inner ring and the outer ring may include a case hardened zone including the layer and a portion of the main body adjacent to the contact region. Case hardening such as by means of a case hardening process (e.g. induction hardening or case carburisation hardening) further increases the robustness of the bearing.

For the same reasons as explained above, a preferred thickness of the portion of the main body adjacent to the contact region is at least 1 millimeter. Furthermore, the portion of the main body adjacent to the contact region preferably has a thickness of 4 millimeters at most.

The first chromium content may be between 1 and 2 percent by weight. Materials with such a comparatively low chromium content result in a low-priced bearing. Other alloying elements may also be present, e.g. C, Mo, Ni, Mn, Si and/or N.

A second aspect of the invention provides a method of manufacturing a bearing according to the first inventive aspect. The method includes steps of:—forming an inner ring and an outer ring of the bearing, wherein at least one of the inner ring and the outer ring includes a main body comprising a first metal composition having a first chromium content;—arranging a layer comprising a second metal composition having a second chromium content higher than the first chromium content on one of an outer side of the inner ring and an inner side of the outer ring;—forming a plurality of rollers; and—assembling the bearing such that the inner ring and the outer ring are concentrically arranged about an axis of rotation and that the rollers are arranged on the layer and between the inner ring and the outer ring.

The method preferably further comprises a step of case hardening the layer after arranging the layer on the inner side of the outer ring or on the outer side of the inner ring. An example of a suitable case hardening process that can be used for case hardening the raceway is induction hardening. Furthermore, different hardening methods may be applied in different steps of the case hardening process such as through hardening, quenching and tempering, case hardening or case carburizing hardening.

The layer may be fixed to the inner ring or the outer ring by different methods such as welding, laser welding, thermal spraying or similar methods.

The main body of the outer ring and/or the inner ring may be formed by forging and/or rolling of the second metal composition to a ring. The main body may be quenched and tempered. Subsequently it may be machined to a desired geometry before the layer is arranged on the main body. When the layer has been added to the main body, the outer ring or inner ring may be machined again in order to arrive at the final geometry of the outer ring or inner ring. This machining process may comprise a plurality of steps such as turning, hard turning, grinding and honing. Furthermore, a case hardening process may be applied at the layer on the inner ring or on the outer ring.

Generally the order of the different process steps of the manufacturing method of the invention may be interchanged depending on the requirements of the specific bearing to be manufactured.

BRIEF DESCRIPTION OF THE DRAWINGS

The invention will be better understood from the following drawings in which a preferred embodiment of the invention will be illustrated by way of example. In the drawings.

DETAILED DESCRIPTION

Figure 1:
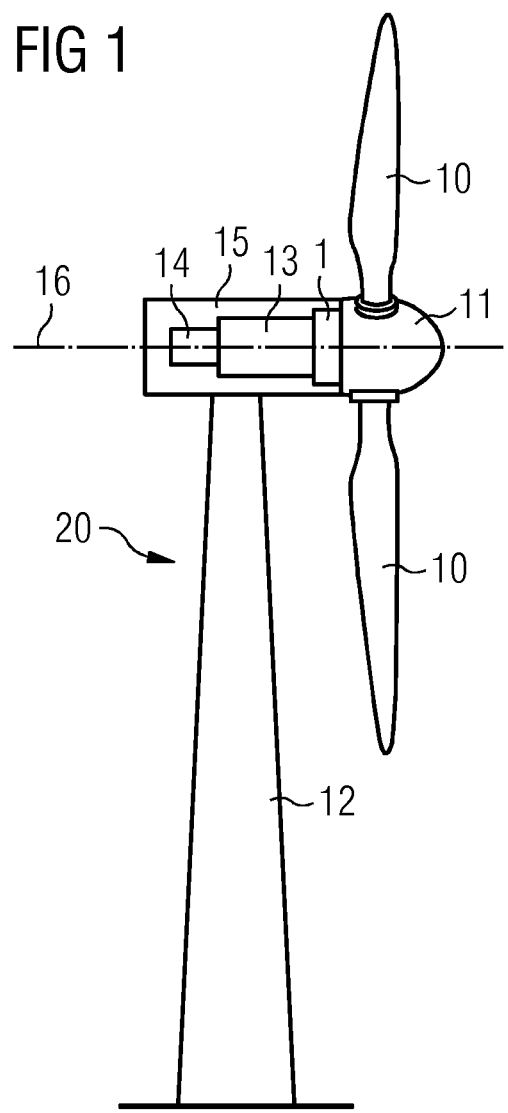
FIG. 1 shows a wind turbine including a bearing according to embodiments of the invention.

FIG. 1 shows a wind turbine 20 including a bearing 1 according to embodiments of the invention. The wind turbine 20 further includes a tower 12, a nacelle 15 arranged at a top end of the tower 12, and a rotor. The rotor includes a plurality of rotor blades 10 and a rotor hub 11. The rotor hub 11 is connected to the bearing 1 located inside the nacelle 15. Furthermore, the rotor is connected to a generator 13 for converting the rotational energy of the rotor 10 into electricity. The bearing 1 and the generator 13 may be connected to a main shaft 14. The rotor hub 11, the bearing 1, the generator 13 and the main shaft 14 are arranged about an axis of rotation 16. However, in a wind turbine including a gearbox the generator 13 need not be arranged about the axis of rotation 16 as will be readily apparent to a person skilled in the art.

Figure 2:
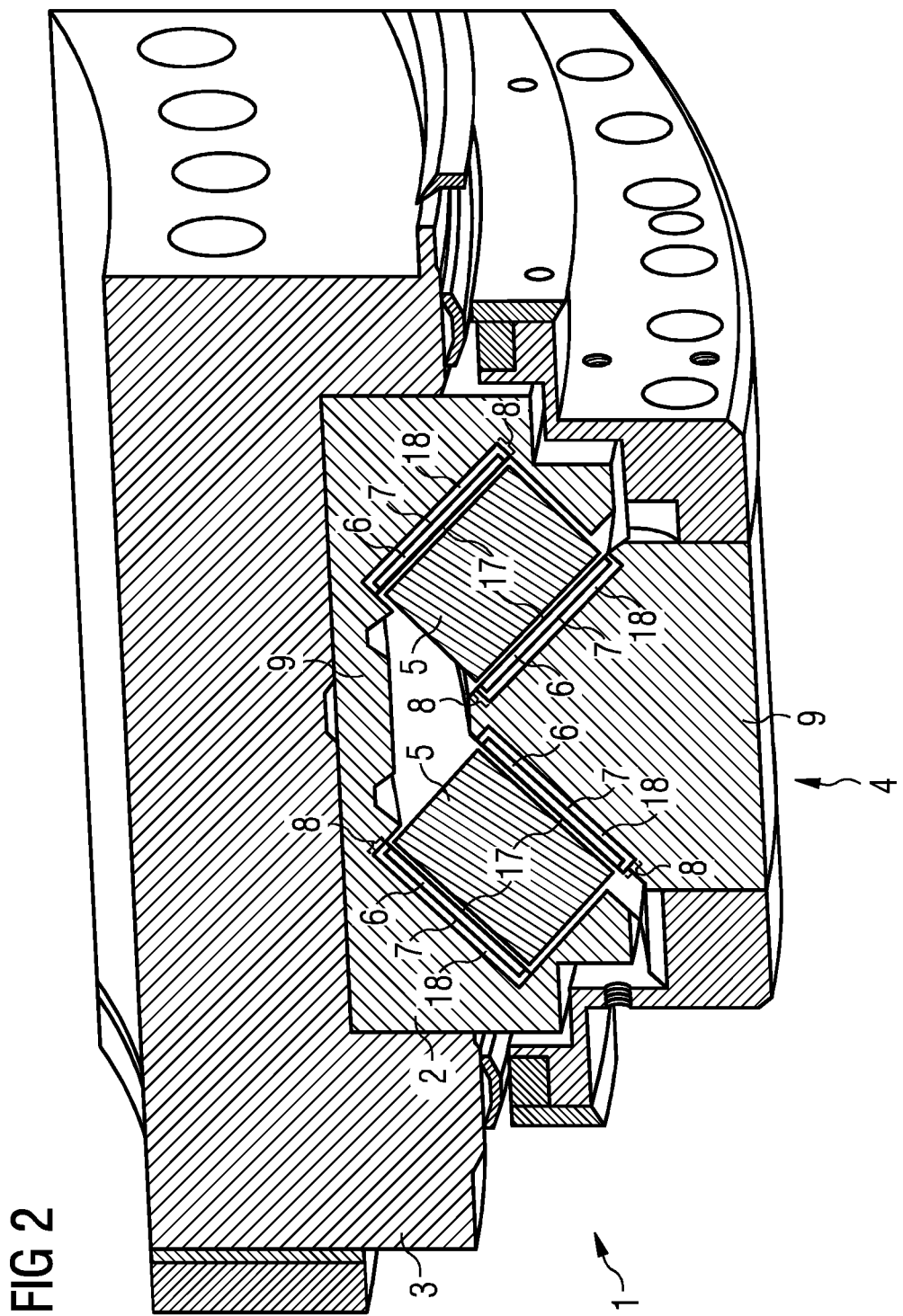
FIG. 2 shows an exemplary embodiment of the bearing of embodiments of the invention.

FIG. 2 shows an exemplary embodiment of the bearing 1 of the invention. The bearing 1 shown in FIG. 2 has a stationary inner ring 2. However, the bearing of the invention may also be provided with a stationary outer ring and a rotating inner ring. While FIG. 2 shows a double row tapered bearing, the invention is not restricted to such specific types of bearings but may be applied to various types of bearings including cylindrical bearings as well as single row bearings.

The inner ring 2 is fixed to a stationary part 3 of a structure e.g. of a wind turbine. For example, the inner ring 2 can be bolted to the stationary part 3 or pressed to it. An outer ring 4 of the bearing 1 is rotatably connected to the inner ring 2 via rollers 5. In some embodiments of the invention the rollers 5 may be balls. The shape, size and material of the rollers or balls 5 depend on the specific design of the bearing. The rollers 5 ride on raceways 17 which represent the respective surfaces of the inner ring 2 and the outer ring 4.

The bearing 1 can be utilized for example in a wind turbine as shown in FIG. 1. In this case, the stationary part 3 may be a main shaft or attached to the main shaft and a blade hub may be attached to the outer ring 4.

According to embodiments of the invention at least one of the inner ring 2 and the outer ring 4 includes at least one layer 6 that comprises a metal composition having a higher content of chromium than a metal composition of a main body 9 of the inner ring 2 and/or the outer ring 4. The layers 6 may have a thickness of between 1 and 4 millimeters. The layers 6 are arranged on respective contact regions 7 of the main body 9 of the outer ring 4 and/or the inner ring 2. In a single row bearing a single layer 6 arranged on a single contact region 7 may be provided. Furthermore, in a double row design a single layer 6 may be used on which both rows of rollers 5 move.

Optionally the surfaces of the inner ring 2 and/or the outer ring 4 may be case hardened, e.g. by using induction hardening. This provides for a hardened or carburized zone 8 as shown in FIG. 3 that includes both the layers 6 and a portion 18 of the main body 9 adjacent to the contact region 7.

Figure 3:
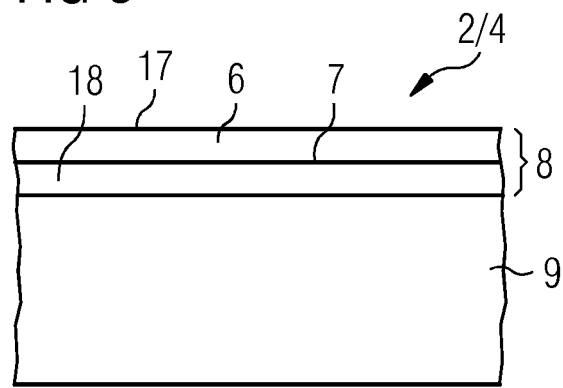
FIG. 3 shows an enlarged partial view of the bearing of FIG. 2.

FIG. 3 shows an enlarged partial view of the bearing of FIG. 2. The partial view shows a part of the inner ring 2 or of the outer ring 4 in the region of one of the layers 6. As mentioned above, the layer 6 is arranged on a contact region 7 of the main body 9 of the inner ring 2 or the outer ring 4. The contact region 7 faces towards the rollers 5 interposed between the inner ring 2 and the outer ring 4. The case hardened zone 8 includes both the layer 6 and a portion 18 of the main body 9 adjacent to the layer 6. According to embodiments of the invention the chromium content of the layer 6 is higher than that of the main body 9 whereto the layer 6 is attached. The layer 6 provides a raceway 17 for the rollers 5 of the bearing.

The bearing of the invention is especially suitable for large wind turbines, e.g. for wind turbines having a nominal output power of greater than 1 Megawatt. However, the bearing of the invention may also be used for other types of rotating machines where high loads may be expected.

Although the invention has been shown and described with respect to exemplary embodiments thereof, various other changes, omissions, and additions in form and detail thereof may be made therein without departing from the spirit and scope of the invention.

While the invention has been described in connection with a preferred embodiment, it is not intended to limit the scope of the invention to the particular form set forth, but on the contrary, it is intended to cover such alternatives, modifications, and equivalents as may be included within the scope of the invention as defined by the appended claims.

The invention claimed is:

1. A bearing for a wind turbine, comprising:
an inner ring and an outer ring concentrically arranged about an axis of rotation, the outer ring having an outer raceway at an inner side of the outer ring and the inner ring having an inner raceway at an outer side of the inner ring, the outer raceway and the inner raceway being adapted to bear a plurality of rollers rotatably arranged on the outer raceway and the inner raceway and between the inner ring and the outer ring,
at least one layer arranged on one of the outer raceway and the inner raceway,
wherein a main body of a corresponding one of the inner ring or the outer ring comprises a first metal composition having a first chromium content, wherein the layer comprises a thickness of at least 1 millimeter, and
wherein the layer comprises a second metal composition having a second chromium content higher than the first chromium content.

2. The bearing of claim 1, wherein the layer has a thickness of 4 millimeters at most.

3. The bearing of claim 1, wherein the second chromium content is at least 5 percent by weight.

4. The bearing of claim 1, wherein the layer is arranged on a contact region of the main body and wherein the corresponding one of the inner ring and the outer ring includes a case hardened zone including the layer and a portion of the main body adjacent to the contact region.

5. The bearing of claim 4, wherein the portion of the main body adjacent to the contact region has a thickness of 4 millimeters at most.

6. The bearing of claim 4, wherein the portion of the main body adjacent to the contact region has a thickness of at least 1 millimeter.

7. The bearing of claim 1, wherein the first chromium content is between 1 percent by weight and 2 percent by weight.

8. A method of manufacturing a bearing according to claim 1, the method including:
   forming an inner ring and an outer ring of the bearing, wherein at least one of the inner ring and the outer ring includes a main body comprising a first metal composition having a first chromium content;
   arranging a layer comprising a second metal composition having a second chromium content higher than the first chromium content on one of an outer side of the inner ring and an inner side of the outer ring, wherein the layer comprises a thickness of at least one millimeter;
   forming a plurality of rollers; and
   assembling the bearing such that the inner ring and the outer ring are concentrically arranged about an axis of rotation and that the rollers are arranged on the layer and between the inner ring and the outer ring.

9. The method of claim 8, further comprising case hardening the layer after arranging the layer on the one of the outer side of the inner ring or the inner side of the outer ring.

10. The bearing of claim 1, wherein the axis of rotation is an axis of rotation of a rotor hub.

\* \* \* \* \*